US010877556B2

(12) United States Patent
Berkner-Cieslicki et al.

(10) Patent No.: US 10,877,556 B2
(45) Date of Patent: Dec. 29, 2020

(54) EYE TRACKING SYSTEM

(71) Applicant: Apple Inc., Cupertino, CA (US)

(72) Inventors: Kathrin Berkner-Cieslicki, Los Altos, CA (US); Ricardo J. Motta, Palo Alto, CA (US); Se Hoon Lim, San Jose, CA (US); Minwoong Kim, San Jose, CA (US); Kenichi Saito, Cupertino, CA (US); Branko Petljanski, San Jose, CA (US); Jason C. Sauers, Sunnyvale, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/788,725

(22) Filed: Oct. 19, 2017

(65) Prior Publication Data

US 2018/0113508 A1 Apr. 26, 2018

Related U.S. Application Data

(60) Provisional application No. 62/411,246, filed on Oct. 21, 2016.

(51) Int. Cl.
*G06F 3/01* (2006.01)
*G06T 7/292* (2017.01)
(Continued)

(52) U.S. Cl.
CPC ......... *G06F 3/013* (2013.01); *G02B 27/0172* (2013.01); *G06T 7/292* (2017.01);
(Continued)

(58) Field of Classification Search
None
See application file for complete search history.

(56) References Cited

U.S. PATENT DOCUMENTS 6,433,760 B1 * 8/2002 Vaissie .................. G01S 17/875
345/8
8,998,414 B2 4/2015 Bohn
(Continued)

FOREIGN PATENT DOCUMENTS

WO 2015048839 4/2015
WO 2016138969 9/2016

OTHER PUBLICATIONS

International Search Report and Written Opinion from PCT/US2017/057703, dated Jan. 24, 2018, Apple Inc., pp. 1-13.
(Continued)

*Primary Examiner* — Heather R Jones
(74) *Attorney, Agent, or Firm* — Robert C. Kowert; Kowert, Hood, Munyon, Rankin & Goetzel, P.C.

(57) ABSTRACT

An eye tracking system for detecting position and movements of a user's eyes in a head-mounted display (HMD). The eye tracking system may include at least one near-IR (NIR) eye tracking camera positioned at each side of the user's face and pointed towards eye-facing surfaces of eyepieces of the HMD, an illumination source that emits NIR light towards the user's eyes, and hot mirrors located between the eye-facing surfaces of the eyepieces and the user's eyes. The hot mirrors reflect at least a portion of NIR light, while allowing visible light to pass. The cameras capture images of the user's eyes reflected by the hot mirrors. Positioning the hot mirrors at or near the eye-facing surfaces of the eyepieces allows the cameras to be placed at the sides of the user's face without having to image through the eyepieces.

20 Claims, 6 Drawing Sheets

(51) Int. Cl.
 H04N 5/33 (2006.01)
 G06T 19/00 (2011.01)
 G02B 27/01 (2006.01)
(52) U.S. Cl.
 CPC ............ *G06T 19/006* (2013.01); *H04N 5/33* (2013.01); *G02B 2027/0187* (2013.01)

(56) References Cited

U.S. PATENT DOCUMENTS

| | | |
|---|---|---|
| 9,625,989 B2 | 4/2017 | Wilson et al. |
| 2015/0009574 A1 | 1/2015 | Liesecke et al. |
| 2015/0035744 A1 | 2/2015 | Robbins et al. |
| 2015/0316771 A1* | 11/2015 | Border ............... G02B 27/0172 359/630 |
| 2016/0165151 A1 | 6/2016 | Corlett |
| 2016/0180591 A1* | 6/2016 | Shiu .................. G02B 27/0172 345/633 |
| 2017/0082858 A1* | 3/2017 | Klug ................. G02B 27/0172 |

OTHER PUBLICATIONS

European Search Report from Application No. 17794543.3-1020, dated Jul. 28, 2020, pp. 1-5.

\* cited by examiner

EYE TRACKING SYSTEM

PRIORITY INFORMATION

This application claims benefit of priority to U.S. Provisional Application No. 62/411,246, filed Oct. 21, 2016, titled "Eye Tracking System," which is hereby incorporated by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

SUMMARY

Various embodiments of methods and apparatus for eye tracking in virtual and mixed or augmented reality (VR/AR) applications are described. A VR/AR device such as a headset, helmet, goggles, or glasses (referred to herein as a head-mounted display (HMD)) is described that includes a display (e.g., left and right displays) for displaying frames including left and right images in front of a user's eyes to thus provide 3D virtual views to the user. The HMD may include left and right optical lenses (referred to herein as eyepieces) located between the display and the user's eyes. The eyepieces form a virtual image of the displayed content at a design distance which is typically close to optical infinity of the eyepieces.

The HMD may include an eye tracking system for detecting position and movements of the user's eyes. The eye tracking system may include at least one eye tracking camera (e.g., near-IR (NIR) cameras) positioned at each side of the user's face and pointed towards the eye-facing surfaces of the respective eyepieces, an illumination source (e.g., an NIR light source) that emits light (e.g., NIR light) towards the user's eyes, and hot mirrors located between the eye-facing surfaces of the eyepieces and the user's eyes. Positioning the hot mirror surfaces at or near the eye-facing surfaces of the eyepieces allows the eye tracking cameras to be placed at the sides of the user's face (e.g., at or near the user's cheek bones) without having to image through the eyepieces.

In some embodiments, the light sources of the HMD emit NIR light to illuminate the user's eyes. A portion of the NIR light is reflected off the user's eyes to the hot mirrors located at or near the eye-facing surfaces of the eyepieces of the HMD. The hot mirrors reflect at least a portion of the NIR light, while allowing visible light to pass. The NIR cameras, for example located at or near the user's cheek bones capture images of the user's eyes reflected by the hot mirrors.

Images captured by the eye tracking system may be analyzed to detect position and movements of the user's eyes, or to detect other information about the eyes such as pupil dilation. For example, the point of gaze on the display estimated from the eye tracking images may enable gaze-based interaction with content shown on the near-eye display of the HMD. Other applications may include, but are not limited to, creation of eye image animations used for avatars in a VR/AR environment.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for eye tracking in virtual and mixed or augmented reality (VR/AR) applications are described. A VR/AR device such as a headset, helmet, goggles, or glasses (referred to herein as a head-mounted display (HMD)) is described that includes a display (e.g., left and right displays) for displaying frames including left and right images in front of a user's eyes to thus provide 3D virtual views to the user. The HMD may include left and right optical lenses (referred to herein as eyepieces) located between the display and the user's eyes. The eyepieces form a virtual image of the displayed content at a design distance which is typically close to optical infinity of the eyepieces. The HMD may include an eye tracking system (which may also be referred to as a gaze tracking system) for detecting position and movements of the user's eyes, or for detecting other information about the eyes such as pupil dilation. The point of gaze on the display estimated from the information captured by the eye tracking system may, for example, allow gaze-based interaction with the content shown on the near-eye display. Other applications may include, but are not limited to, creation of eye image animations used for avatars in a VR/AR environment.

Embodiments of an eye tracking system for HMDs are described that include at least one eye tracking camera (e.g., near-IR (NIR) cameras) positioned at each side of the user's face (e.g., at or near the user's cheek bones) and pointed towards the eye-facing surfaces of the respective eyepieces, an illumination source (e.g., an NIR light source) that emits light (e.g., NIR light) towards the user's eyes, and hot mirrors located between the eye-facing surfaces of the eyepieces and the user's eyes. A hot mirror may be defined as a mirror that acts as a dichroic filter to reflect light in the near-infrared range while allowing visible light to pass. In some embodiments, the hot mirrors may be implemented as a dichroic filter coating on the eye-facing surfaces of the eyepieces; the eye-facing surfaces of the eyepieces may be, but are not necessarily, planar. Alternatively, the hot mirrors may be implemented as a separate component (e.g., flat sheets of glass or other transparent material with a dichroic filter coating or layer) positioned at or near the eye-facing surfaces of the eyepieces. Positioning the hot mirror surfaces at or near the eye-facing surfaces of the eyepieces and thus between the eyepieces and the user's eyes allows the eye tracking cameras to be placed at the sides of the user's face (e.g., at or near the user's cheek bones) without having to image through the eyepieces.

While embodiments of an eye tracking system for HMDs are generally described herein as including at least one eye tracking camera positioned at each side of the user's face to track the gaze of both of the user's eyes, an eye tracking system for HMDs may also be implemented that includes at least one eye tracking camera positioned at only one side of the user's face to track the gaze of only one of the user's eyes.

Figure 1A:
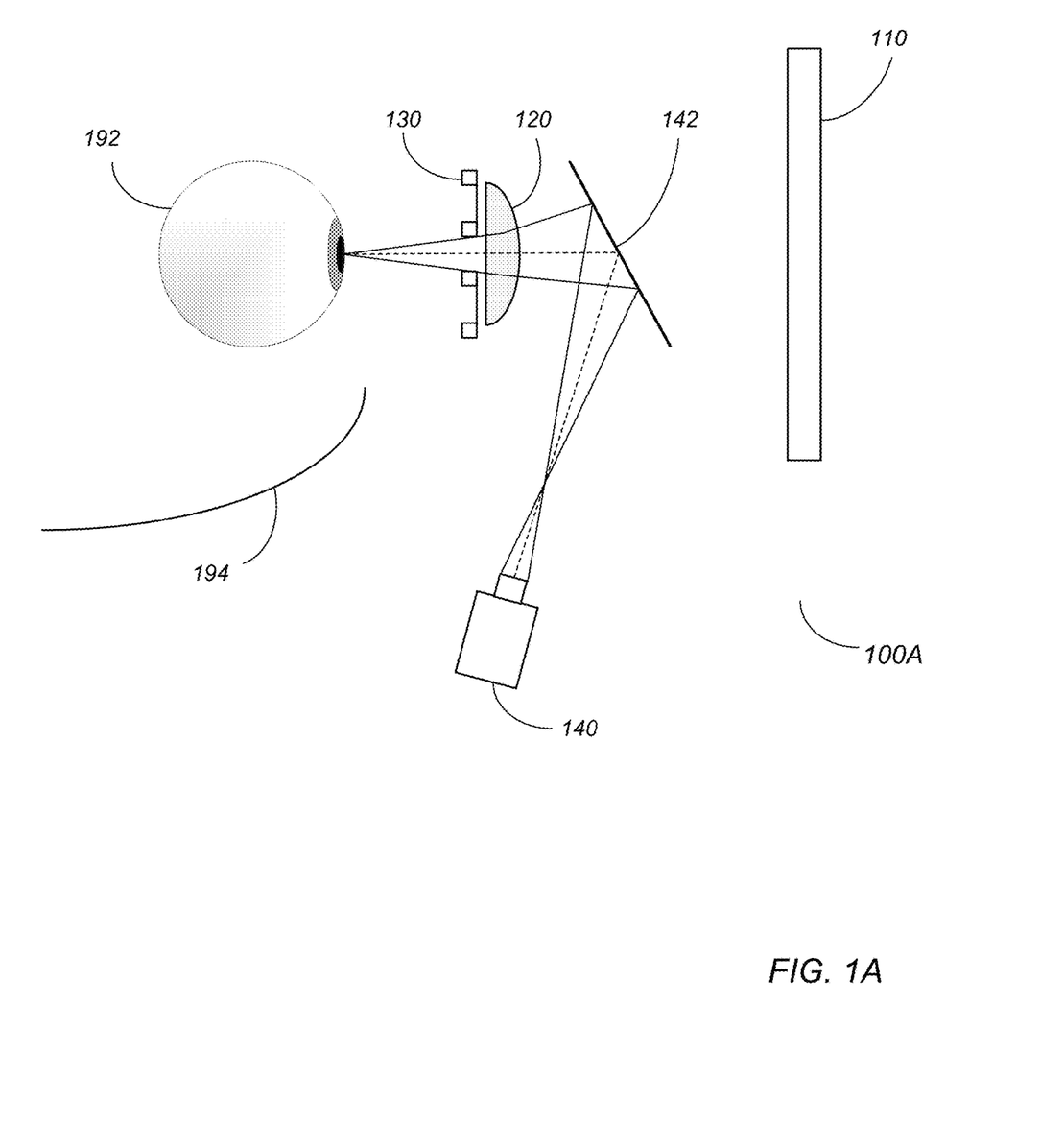
FIGS. 1A and 1B illustrate eye tracking systems for VR/AR head-mounted displays (HMDs).
Figure 1B:
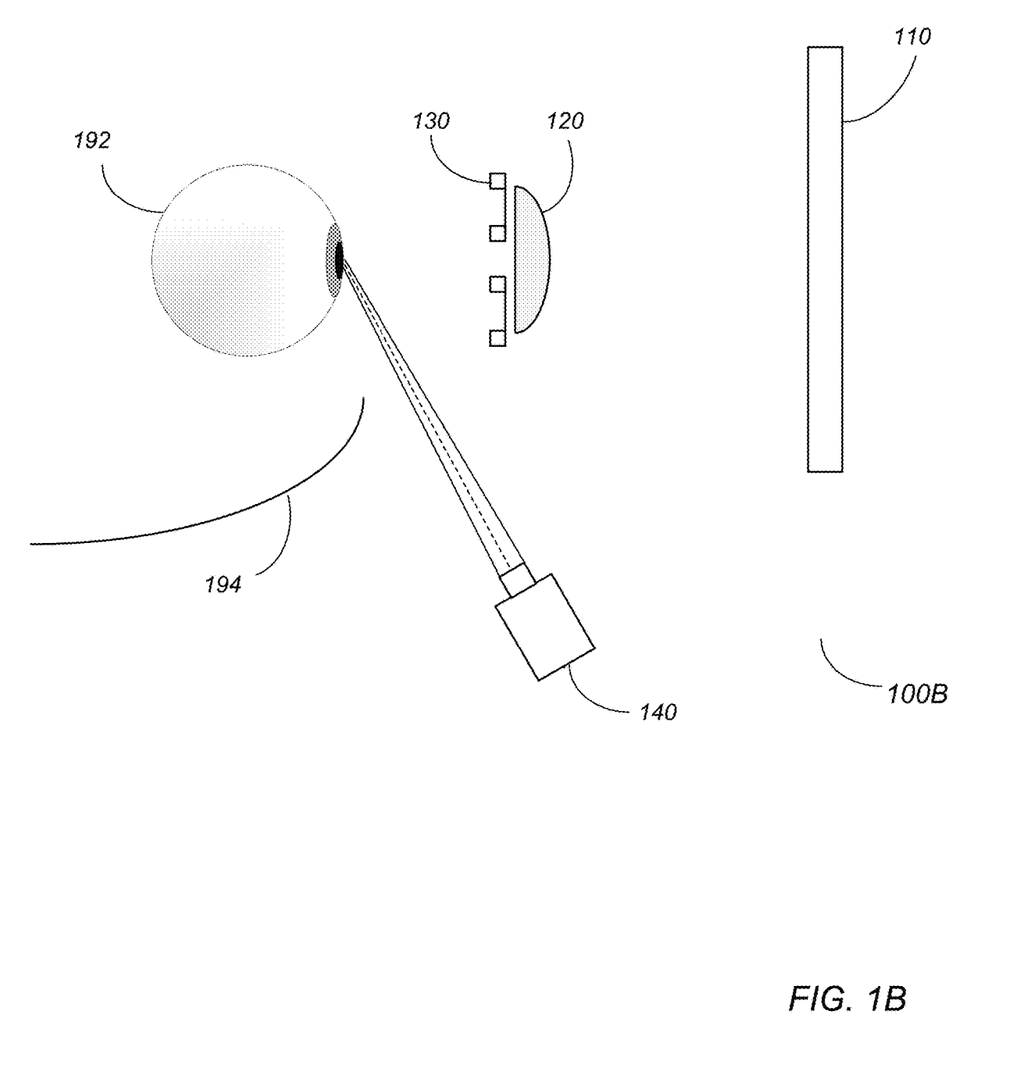

FIGS. 1A and 1B illustrate eye tracking systems for VR/AR HMDs. A VR/AR HMD 100 may include a display 110 and two eyepiece lenses 120, mounted in a wearable housing. The user looks through the eyepieces 120 onto the display 110. The eyepieces 120 form a virtual image of the displayed content at a design distance which is typically close to optical infinity of the eyepieces 120. To fit eye tracking cameras 140 into the HMD 100 housing, two different camera optical paths have been used. As shown in HMD 100A of FIG. 1A, in a first camera optical path, the cameras 140 capture light through the eyepiece 120. As shown in HMD 100B of FIG. 1B, in a second camera optical path, the cameras 140 have a direct view of the user's eyes.

Referring to HMD 100A of FIG. 1A, the cameras 140 are positioned such that a frontal view of the eyes 192 is captured through the eyepieces 120. In order to remove the cameras 140 from the user's field of view, hot mirrors 142 are positioned between the eyepieces 120 and the display 110 to fold the camera 140 optical paths away from the visible light display 110 optical paths. NIR light source(s) 130 may be positioned in the HMD 100A (e.g., around the eyepieces 120, or elsewhere in the HMD 100A) to illuminate the user's eyes 192 with NIR light.

Referring to HMD 100B of FIG. 1B, the cameras 140 do not look through the eyepieces 120, but instead have direct views onto the user's eyes 192. For this optical path, cameras 140 are typically mounted at the side of the user's nose, the side of the cheek-bone 194, or on top or bottom of an eyeglass-frame. Physical constraints of the HMD 100B housing may determine which position is suitable for a given system. Since the eyepieces 120 are close to the user's eyes 192, there is not enough space to place a hot mirror to fold the cameras 140 away from the user's face as it is done in HMD 100A. As a consequence, the cameras 140 do not have a frontal view onto the user's eyes 192. Thus, the incident angle of a camera 140's on-axis chief ray on the nominal cornea plane which is parallel to the display 110 plane may be substantially less than 90 degrees.

The camera optical paths shown in FIGS. 1A and 1B have advantages and disadvantages. The through-the-eyepiece view of FIG. 1A allows a more centered view of the eye, but has to deal with distortions in the eye images introduced by the eyepiece. The direct view of FIG. 1B does not pass through the eyepiece, but may look onto the eye from a tilted position which may cause reduced detection accuracy of eye features at extreme gaze angles due to distortion, insufficient depth-of-field, and occlusions.

Figure 2:
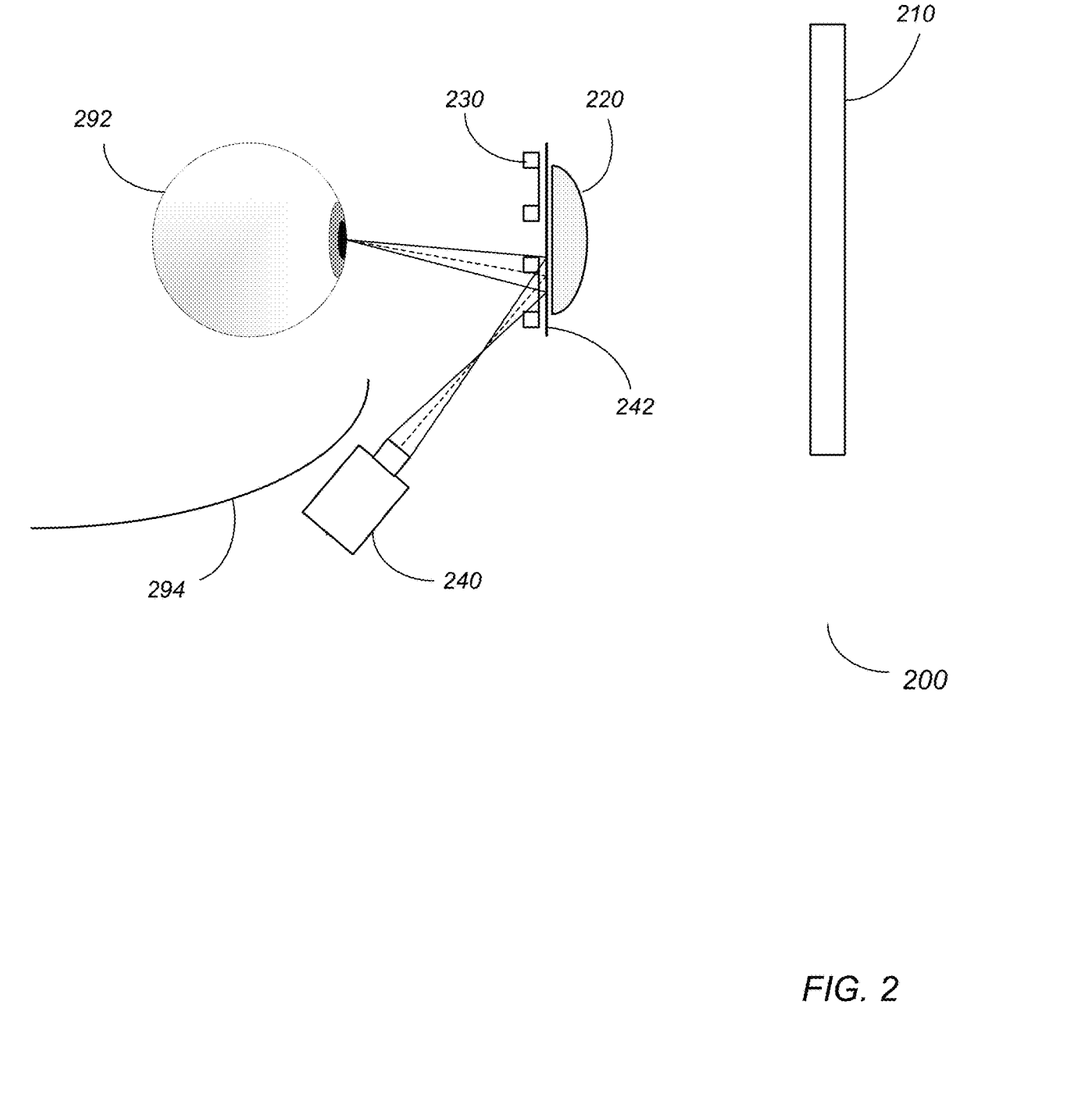
FIG. 2 illustrates a VR/AR HMD that implements an eye tracking system that includes hot mirrors located between the eye-facing surfaces of the eyepieces and the user's eyes, and eye tracking cameras located at the sides of the user's face, according to some embodiments.

FIG. 2 illustrates a VR/AR HMD 200 that implements an eye tracking system that includes hot mirrors 242 located between the eye-facing surfaces of the eyepieces 220 and the user's eyes 292, and eye tracking cameras 240 located at the sides of the user's face (e.g., at or near the user's cheek bones 294), according to some embodiments. VR/AR HMD 200 may include a display 210 and two eyepieces 220, mounted in a wearable housing. The user looks through the eyepieces 220 onto the display 210. The eyepieces 220 form a virtual image of the displayed content at a design distance which is typically close to optical infinity of the eyepieces 220. The eye tracking system may, for example, be used to track position and movement of the user 290's eyes. In some embodiments, the eye tracking system may instead or also be used to track dilation of the user 290's pupils, or other characteristics of the user 290's eyes. NIR light source(s) 230 (e.g., NIR LEDs) may be positioned in the HMD 200 (e.g., around the eyepieces 220, or elsewhere in the HMD 200) to illuminate the user's eyes 292 with NIR light. The hot mirrors 242 are positioned at or near the eye-facing surfaces of the eyepieces 220. The optical paths for the eye tracking cameras 240 provide a direct view of the eyes 292 via reflection off the hot mirrors 242. The eye tracking system of FIG. 2 thus provide direct-view (i.e., not through the eyepieces 220) eye tracking cameras 240 that capture a portion of NIR light emitted by light sources 230, reflected off the user's eyes, and reflected by hot mirrors 242 located at the eye-facing surface of the eyepieces 220 to the cameras 240 to image the user's eyes 292. The eye tracking system of FIG. 2 provides an eye tracking camera optical path that enables a smaller tilt-angle as in the camera optical path shown in FIG. 1B, but that avoids looking through the eyepieces as in in the camera optical path shown in FIG. 1A.

In some embodiments, the HMD eye tracking system of FIG. 2 may use eyepieces 220 with flat or convex eye-facing surfaces and hot mirrors 242 positioned at or near the eye-facing surfaces of the eyepieces 220. By positioning the hot mirrors 242 on or near the eye-facing surfaces of the eyepieces 220, the camera optical path can be folded, resulting in a larger incident angle of the camera axis on the center pupil location (closer to 90 degrees) than in direct-view eye tracking camera architectures as shown in FIG. 1B.

In some embodiments, the hot mirrors 242 may be implemented as separate components (e.g., flat pieces or sheets of glass or other transparent material with hot mirror coating) mounted or attached to the eye-facing surfaces of the eyepieces 220, or alternatively as a coating on the eye-facing surfaces of the eyepieces 220. In both cases, the characteristics of the hot mirror need to take reflectivity over a variety of angles in the near-infrared (NIR) spectrum into account, as well as over the visible spectrum. Example hot mirror specifications are described in TABLE 1, including >90% reflectivity of NIR at a nominal camera incident angle on the hot mirror (e.g. 30 degrees), less than 1% reflectivity of visible light at 0 degrees, and less than 10% reflectivity at incident angles >55 degrees.

In some embodiments, the display 210 emits light in the visible light range and does not emit light in the NIR range, and thus does not introduce noise in the eye tracking system.

TABLE 1 provides parameters for an example embodiment of a hot mirror 220, and is not intended to be limiting. The values given in the cells may be varied within reasonable limits while still achieving similar results. For example, the value for near-infrared light given in the first column, row four (850 nm+/−25 nm) may be 940 nanometers (nm)+/−25 nm, or other values may be used. As another example, the Incident angle of 30 degrees given in the third column, row one and/or the Incident angle of 55 degrees given in the fourth column, row one may be varied by a few degrees.

TABLE 1

|  | Incident angle 0 degree | Incident angle 30 degrees | Incident angle 55 degrees |
| --- | --- | --- | --- |
| 460-650 nm | Average reflectivity < 0.5% | — | Average reflectivity < 5% |
| 650-700 nm | Average reflectivity < 1% | — | Average reflectivity < 10% |
| 850 nm +/− 25 nm | — | Average reflectivity > 90% | — |

Figure 3:
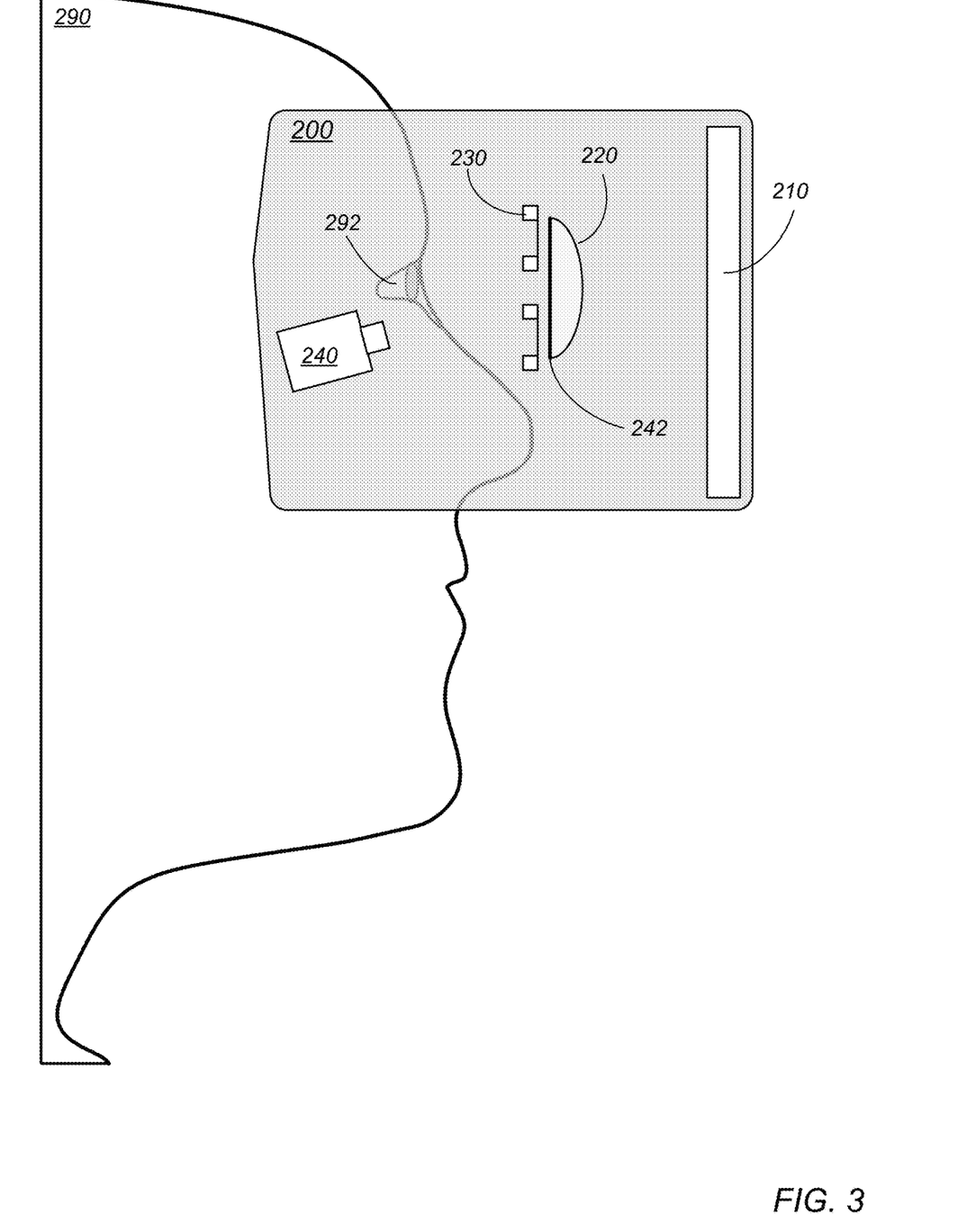
FIG. 3 shows a side view of an example HMD that implements an eye tracking system as illustrated in FIG. 2, according to some embodiments.

FIG. 3 shows a side view of an example HMD 200 that implements an eye tracking system as illustrated in FIG. 2, according to some embodiments. Note that HMD 200 as illustrated in FIG. 3 is given by way of example, and is not intended to be limiting. In various embodiments, the shape, size, and other features of an HMD 200 may differ, and the locations, numbers, types, and other features of the components of an HMD 200 may vary. The eye tracking system may, for example, be used to track position and movement of the user 290's eyes. In some embodiments, the eye tracking system may instead or also be used to track dilation of the user 290's pupils, or other characteristics of the user 290's eyes. Information collected by the eye tracking system may be used in various VR or AR system functions. For example, the point of gaze on the display 210 may be estimated from images captured by the eye tracking system; the estimated point of gaze may, for example, enable gaze-based interaction with content shown on the near-eye display 210. Other applications of the eye tracking information may include, but are not limited to, creation of eye image animations used for avatars in a VR or AR environment. As another example, in some embodiments, the information collected by the eye tracking system may be used to adjust the rendering of images to be projected, and/or to adjust the projection of the images by the projection system of the HMD 200, based on the direction and angle at which the user 290's eyes are looking. As another example, in some embodiments, brightness of the projected images may be modulated based on the user 290's pupil dilation as determined by the eye tracking system.

As shown in FIG. 3, HMD 200 may be positioned on the user 290's head such that the display 210 and eyepieces 220 are disposed in front of the user 290's eyes 292. One or more NIR light source(s) 230 (e.g., NIR LEDs) may be positioned in the HMD 200 (e.g., around the eyepieces 220, or elsewhere in the HMD 200) to illuminate the user 290's eyes 292 with NIR light. In some embodiments, the MR light source(s) 230 may emit light at different NIR wavelengths (e.g., 850 nm and 940 nm). Hot mirrors 242 are positioned at or near the eye-facing surfaces of the eyepieces 220. The hot mirrors 242 may be optimized according to the NIR wavelength(s) of the eye tracking camera(s) 240, positions of the cameras 240, and the display 210 optics specifications. At least one eye tracking camera 240 (e.g., an NIR camera, for example a 400×400 pixel count camera, that operates at 850 nm or 940 nm, or at some other NIR wavelength) is located at each side of the user 290's face, for example below the user's eye and at or near the user 290's cheek bones as shown in FIG. 3. Note that the location and angle of eye tracking camera 240 is given by way of example, and is not intended to be limiting. While FIG. 3 shows a single eye tracking camera 240 located on each side of the user 290's face, in some embodiments there may be two or more NIR cameras 240 on each side of the user 290's face. For example, in some embodiments, a camera 240 with a wider field of view (FOV) and a camera 240 with a narrower FOV may be used on each side of the user's face. As another example, in some embodiments, a camera 240 that operates at one wavelength (e.g. 850 nm) and a camera 240 that operates at a different wavelength (e.g. 940 nm) may be used on each side of the user's face. A portion of NIR light emitted by light source(s) 230 reflects off the user 290's eyes, is reflected by hot mirrors 242 to the cameras 240, and is captured by the cameras 242 to image the user's eyes 292.

Embodiments of the HMD 200 with an eye tracking system as illustrated in FIG. 3 may, for example, be used in augmented or mixed (AR) applications to provide augmented or mixed reality views to the user 290. While not shown, in some embodiments, HMD 200 may include one or more sensors, for example located on external surfaces of the HMD 200, that collect information about the user 290's external environment (video, depth information, lighting information, etc.); the sensors may provide the collected information to a controller (not shown) of the VR/AR system. In some embodiments, the sensors may include one or more visible light cameras (e.g., RGB video cameras) that capture video of the user's environment that may be used to provide the user 290 with a virtual view of their real environment. In some embodiments, video streams of the real environment captured by the visible light cameras may be processed by the controller of the HMD 200 to render augmented or mixed reality frames that include virtual content overlaid on the view of the real environment, and the rendered frames may be provided to the projection system of the HMD 200 for display on display 210.

Embodiments of the HMD 200 with an eye tracking system as illustrated in FIG. 3 may also be used in virtual reality (VR) applications to provide VR views to the user 290. In these embodiments, the controller of the HMD 200 may render or obtain virtual reality (VR) frames that include virtual content, and the rendered frames may be provided to the projection system of the HMD 200 for display on display 210.

Figure 4:
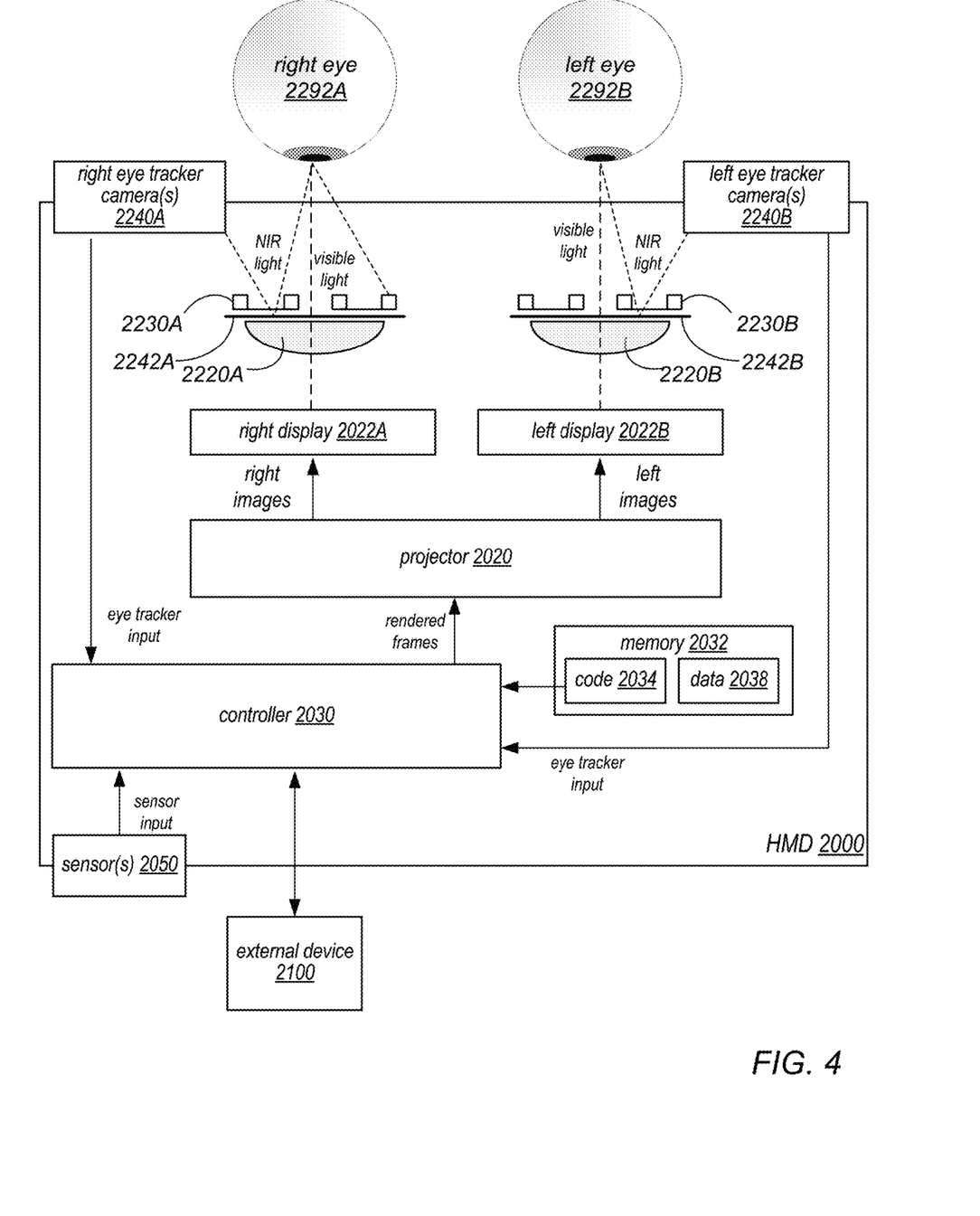
FIG. 4 is a block diagram illustrating components of an example VR/AR system that includes an eye tracking system as illustrated in FIG. 2, according to some embodiments.

The controller may be implemented in the HMD 200, or alternatively may be implemented at least in part by an external device (e.g., a computing system) that is communicatively coupled to HMD 200 via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that include virtual content based at least in part on the inputs obtained from the sensors, and may provide the frames to a projection system of the HMD 200 for display to display 210. FIG. 4 further illustrates components of a HMD and VR/AR system, according to some embodiments.

FIG. 4 is a block diagram illustrating components of an example VR/AR system 1900 that includes an eye tracking system as described herein, according to some embodiments. In some embodiments, a VR/AR system 1900 may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eyepieces 2220A and 2220B. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 configured to implement functionality of the VR/AR system 1900 and to generate frames (each frame including a left and right image) that are displayed by the projector 2020. In some embodiments, HMD 2000 may also include a memory 2032 configured to store software (code 2034) of the VR/AR system that is executable by the controller 2030, as well as data 2038 that may be used by the VR/AR system 1900 when executing on the controller 2030. In some embodiments, HMD 2000 may also include one or more interfaces (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors 2050 that collect information about the user's environment (video, depth information, lighting information, etc.). The sensors 2050 may provide the information to the controller 2030 of the VR/AR system 1900. In some embodiments, sensors 2050 may include, but are not limited to, visible light cameras (e.g., video cameras).

As shown in FIG. 3, HMD 2000 may be positioned on the user's head such that the displays 2022A and 2022B and eyepieces 2220A and 2220B are disposed in front of the user's eyes 2292A and 2292B. NIR light sources 2230A and 2230B (e.g., NIR LEDs) may be positioned in the HMD 2000 (e.g., around the eyepieces 2220A and 2220B, or elsewhere in the HMD 2000) to illuminate the user's eyes 2292A and 2292B with NIR light. Hot mirrors 2242A and 2242B are positioned at or near the eye-facing surfaces of the eyepieces 2220A and 2220B. Eye tracking cameras 2240A and 2240B (e.g., NIR cameras, for example 400×400 pixel count cameras) are located at each side of the user's face, for example at or near the user's cheek bones as shown in FIG. 3. Note that the location of eye tracking cameras 2240A and 2240B is given by way of example, and is not intended to be limiting. In some embodiments, there may be a single eye tracking camera 2240 located on each side of the user's face. In some embodiments there may be two or more NIR cameras 2240 on each side of the user's face. For example, in some embodiments, a wide-angle camera 2240 and a narrower-angle camera 2240 may be used on each side of the user's face. A portion of NIR light emitted by light sources 2230A and 2230B reflects off the user's eyes 2292A and 2292B, is reflected by hot mirrors 2242A and 2242B to respective eye tracking cameras 2240A and 2240B, and is captured by the eye tracking cameras 2240A and 2240B to image the user's eyes 2292A and 2292B. Eye tracking information captured by the cameras 2240A and 2240B may be provided to the controller 2030. The controller 2030 may analyze the eye tracking information (e.g., images of the user's eyes 2292A and 2292B) to determine eye position and movement, pupil dilation, or other characteristics of the eyes 2292A and 2292B.

The eye tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B; the estimated point of gaze may, for example, enable gaze-based interaction with content shown on the displays 2022A and 2022B. Other applications of the eye tracking information may include, but are not limited to, creation of eye image animations used for avatars in a VR or AR environment. As another example, in some embodiments, the information obtained from the eye tracking cameras 2240A and 2240B may be used to adjust the rendering of images to be projected, and/or to adjust the projection of the images by the projector 2020 of the HMD 2000, based on the direction and angle at which the user's eyes are looking. As another example, in some embodiments, brightness of the projected images may be modulated based on the user's pupil dilation as determined by the eye tracking system.

In some embodiments, the HMD 2000 may be configured to render and display frames to provide an augmented or mixed reality (AR) view for the user at least in part according to sensor 2050 inputs. The AR view may include renderings of the user's environment, including renderings of real objects in the user's environment, based on video captured by one or more video cameras that capture high-quality, high-resolution video of the user's environment for display. The AR view may also include virtual content (e.g., virtual objects, virtual tags for real objects, avatars of the user, etc.) generated by VR/AR system 1900 and composited with the projected view of the user's real environment.

Embodiments of the HMD 2000 as illustrated in FIG. 4 may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B.

Figure 5:
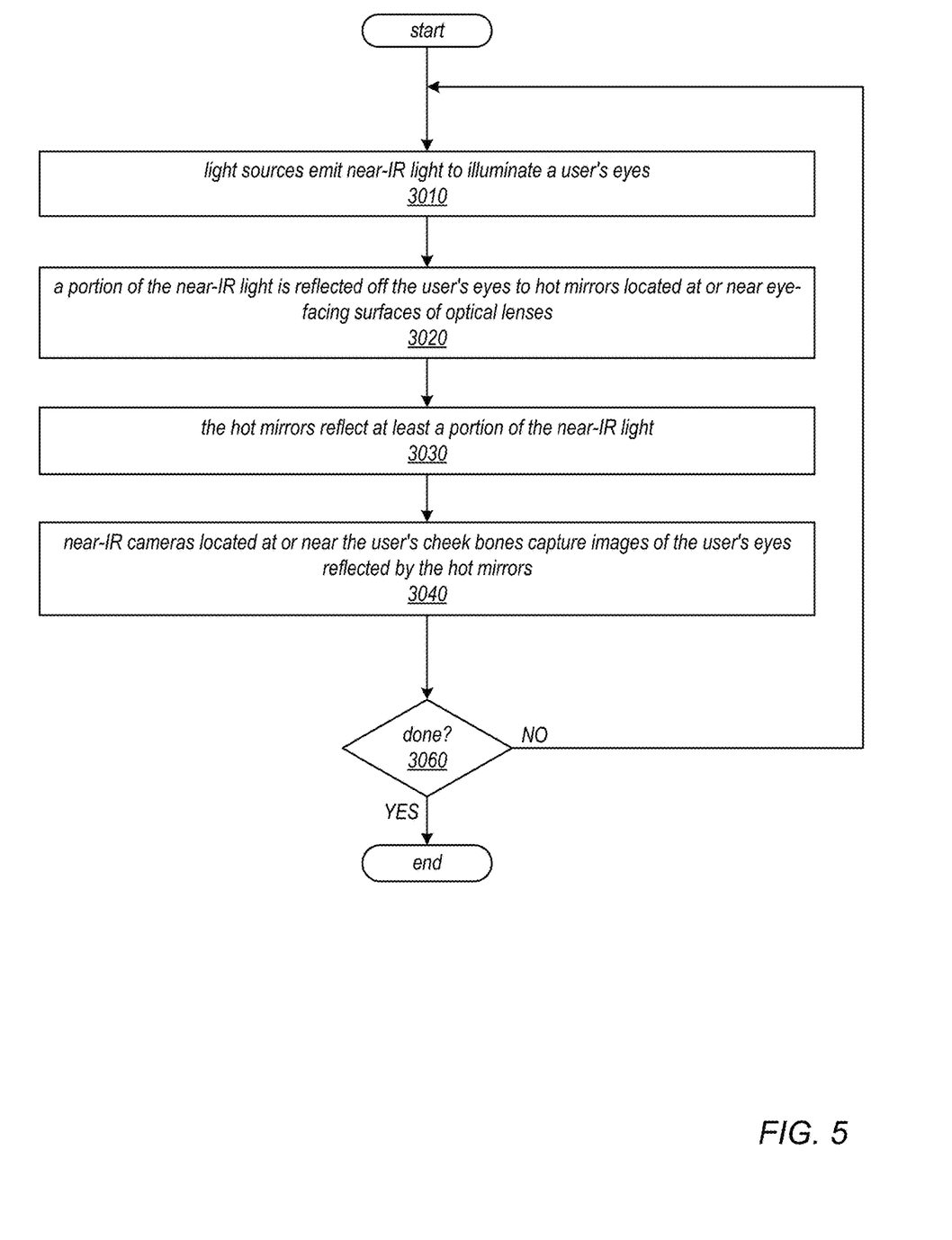
FIG. 5 is a high-level flowchart illustrating a method of operation of an HMD that includes an eye tracking system as illustrated in FIGS. 2 through 4, according to some embodiments.

FIG. 5 is a high-level flowchart illustrating a method of operation of an HMD that includes an eye tracking system as illustrated in FIGS. 2 through 4, according to some embodiments. As indicated at 3010, light sources of the HMD emit NIR light to illuminate a user's eyes. As indicated at 3020, a portion of the NIR light is reflected off the user's eyes to hot mirrors located at or near eye-facing surfaces of optical lenses (eyepieces) of the HMD. As indicated at 3030, the hot mirrors reflect at least a portion of the NIR light, while allowing visible light to pass. As indicated at 3040, NIR cameras located at or near the user's cheek bones capture images of the user's eyes reflected by the hot mirrors. The arrow returning from element 3060 to element 3010 indicates that the eye tracking process may be a continuous process as long as the user is using the HMD.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A system, comprising:
 a head-mounted display (HMD) configured to display visual content for viewing by a user, wherein the HMD comprises:

at least one display screen positioned in front of the user's left and right eyes and configured to display frames of visual content for viewing by the user;

left and right optical lenses positioned between the at least one display screen and the user's left and right eyes such that the user views the frames of visual content displayed by the at least one display screen through the left and right optical lenses;

one or more infrared or near-infrared light sources configured to emit infrared or near-infrared light towards the user's eyes;

left and right hot mirrors positioned between the left and right optical lenses and the user's left and right eyes at or near eye-facing surfaces of the left and right optical lenses such that the hot mirrors reflect infrared or near-infrared light returned from the user's eyes and to allow visible light from the at least one display screen to pass through the left and right optical lenses and subsequently the left and right hot mirrors to the user's eyes; and left and right infrared or near-infrared cameras configured to capture a portion of the infrared or near-infrared light reflected by the left and right hot mirrors to generate images of the user's eyes.

2. The system as recited in claim 1, wherein the left and right infrared or near-infrared cameras are configured to be positioned at or near the user's left and right cheek bones when wearing the HMD.

3. The system as recited in claim 1, wherein the left and right infrared or near-infrared cameras include at least one camera that images the user's left eye and at least one camera that images the user's right eye.

4. The system as recited in claim 1, wherein the hot mirrors are configured to provide >90% reflectivity of near-infrared light at a nominal camera incident angle on the hot mirror, less than 1% reflectivity of visible light at 0 degrees, and less than 10% reflectivity of visible light at incident angles >55 degrees.

5. The system as recited in claim 4, wherein the nominal camera incident angle is 30 degrees.

6. The system as recited in claim 1, wherein the hot mirrors are implemented as coatings on the eye-facing surfaces of the left and right optical lenses.

7. The system as recited in claim 1, wherein the hot mirrors are implemented as coatings on surfaces of flat pieces of a transparent material located at or near the eye-facing surfaces of the left and right optical lenses.

8. The system as recited in claim 1, further comprising a controller comprising one or more processors, wherein the controller is configured to:
  obtain the images of the user's eyes from the left and right infrared or near-infrared cameras; and
  analyze the images of the user's eyes to determine eye tracking information.

9. The system as recited in claim 8, wherein the eye tracking information includes one or more of eye position, eye movement, or pupil dilation.

10. The system as recited in claim 8, wherein the controller is further configured to render the frames for display by the at least one display screen.

11. The system as recited in claim 1, further comprising one or more visible light cameras configured to capture views of the user's environment, wherein the visual content includes virtual content composited into the views of the user's environment to provide an augmented or mixed reality view to the user.

12. The system as recited in claim 1, wherein the visual content includes virtual content to provide a virtual reality view to the user.

13. The system as recited in claim 1, wherein the left and right optical lenses are configured to form a virtual image of the frames displayed by the at least one display screen at a distance at or near optical infinity of the optical lenses.

14. A method, comprising:
  emitting, by one or more light sources of a head-mounted display (HMD), NIR light to illuminate a user's eyes;
  receiving, at hot mirrors positioned between optical lenses of the HMD and the user's eyes at or near eye-facing surfaces of the optical lenses of the HMD, a portion of the NIR light reflected off the user's eyes, wherein the optical lenses are positioned between a display screen of the HMD and the user's eyes such that the user views visible light from the display screen passing through the optical lenses and subsequently the hot mirrors to the user's eyes;
  reflecting, by the hot mirrors, at least a portion of the received NIR light; and
  capturing, by NIR cameras of the HMD positioned at or near the user's cheek bones, images of the user's eyes as reflected by the hot mirrors.

15. The method as recited in claim 14, wherein the HMD is configured to display virtual reality (VR) or augmented reality (AR) views to the user.

16. The method as recited in claim 14, wherein the infrared or near-infrared cameras include at least one camera that images the user's left eye and at least one camera that images the user's right eye.

17. The method as recited in claim 14, wherein the hot mirrors are configured to provide >90% reflectivity of near-infrared light at a nominal camera incident angle on the hot mirror, less than 1% reflectivity of visible light at 0 degrees, and less than 10% reflectivity of visible light at incident angles >55 degrees.

18. The method as recited in claim 17, wherein the nominal camera incident angle is 30 degrees.

19. The method as recited in claim 14, wherein the hot mirrors are implemented as coatings on the eye-facing surfaces of the left and right optical lenses or as coatings on surfaces of flat pieces of a transparent material located at or near the eye-facing surfaces of the left and right optical lenses.

20. The method as recited in claim 14, further comprising:
  obtaining, by a controller of the HMD, the images of the user's eyes from the infrared or near-infrared cameras; and
  analyzing, by the controller, the images of the user's eyes to determine eye tracking information, wherein the eye tracking information includes one or more of eye position, eye movement, or pupil dilation.

* * * * *